US011218056B2

(12) United States Patent
Okubo et al.

(10) Patent No.: US 11,218,056 B2
(45) Date of Patent: Jan. 4, 2022

(54) MAIN ELECTRIC-MOTOR FOR VEHICLE

(71) Applicant: Mitsubishi Electric Corporation, Tokyo (JP)

(72) Inventors: Tatsuro Okubo, Tokyo (JP); Hideo Terasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 193 days.

(21) Appl. No.: 16/484,630

(22) PCT Filed: Mar. 7, 2017

(86) PCT No.: PCT/JP2017/008876
§ 371 (c)(1),
(2) Date: Aug. 8, 2019

(87) PCT Pub. No.: WO2018/163264
PCT Pub. Date: Sep. 13, 2018

(65) Prior Publication Data
US 2020/0059133 A1    Feb. 20, 2020

(51) Int. Cl.
H02K 9/06         (2006.01)
B61C 3/00         (2006.01)
(Continued)

(52) U.S. Cl.
CPC ............ H02K 9/06 (2013.01); B61C 3/00 (2013.01); F04D 25/06 (2013.01); H02K 7/08 (2013.01); H02K 7/14 (2013.01)

(58) Field of Classification Search
CPC .... H02K 9/06; H02K 7/08; B61C 3/00; F04D 25/06; F04D 29/441; F04D 29/5806; F04D 29/4253; F04D 25/082; F05D 2250/52
See application file for complete search history.

(56) References Cited

U.S. PATENT DOCUMENTS

2006/0226717 A1   10/2006  Nagayama et al.
2008/0042502 A1*   2/2008  VanLuik ............. H02K 9/22
                                                 310/89
2015/0000549 A1*   1/2015  Nagayama ........... H02K 9/06
                                                104/288

FOREIGN PATENT DOCUMENTS

CH        203227 A      2/1939
DE        75095 A1      5/1970
(Continued)

OTHER PUBLICATIONS

International Search Report (with English translation) and Written Opinion issued in corresponding International Patent Application No. PCT/JP2017/008876, 6 pages (dated Jun. 6, 2017).
(Continued)

Primary Examiner — Tulsidas C Patel
Assistant Examiner — Riley Owen Stout
(74) Attorney, Agent, or Firm — Buchanan Ingersoll & Rooney PC

(57) ABSTRACT

A first bearing box has, in one end face perpendicular to a direction along a rotor shaft and farther from a fan, an air outlet for air taken in through an air inlet to exit. A flow channel is defined between an outer peripheral surface of a cylindrical portion of the first bearing box continuous with the end face and a frame. A value obtained by dividing a distance between an outer periphery of blades in the fan and the air outlet by an outer radius of the blades is greater than or equal to a threshold.

11 Claims, 18 Drawing Sheets

(51) Int. Cl.
F04D 25/06 (2006.01)
H02K 7/08 (2006.01)
H02K 7/14 (2006.01)

(56) References Cited

FOREIGN PATENT DOCUMENTS

| | | |
|---|---|---|
| DE | 29716977 U1 | 1/1998 |
| DE | 10122425 A1 | 11/2002 |
| DE | 102010000830 A1 | 7/2011 |
| JP | H11146605 A | 5/1999 |

OTHER PUBLICATIONS

Office Action dated Oct. 15, 2020, by the German Patent Office in corresponding German Patent Application No. 112017007210.7 and English translation of the Office Action. (14 pages).

* cited by examiner

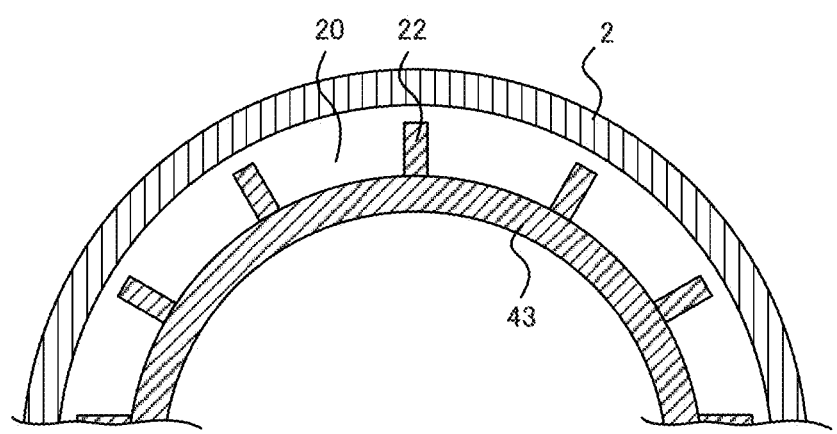
FIG.12
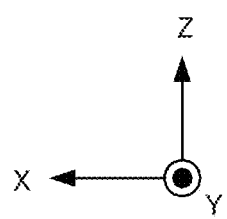

MAIN ELECTRIC-MOTOR FOR VEHICLE

TECHNICAL FIELD

The present disclosure relates to a self-ventilation main motor for vehicles.

BACKGROUND ART

A squirrel-cage induction motor is used as a main motor for driving an electric railway vehicle. A squirrel-cage rotor conductor included in the squirrel-cage induction motor includes a rotor core having slots on the outer periphery in the direction along a rotor shaft, and rod-like rotor bars received in the slots, and short-circuit rings as annular conductors bonded on both ends of the rotor bars. An alternating current flows through a stator coil received in a slot on a stator core thereby generating a rotating magnetic field. The squirrel-cage rotor conductor interlinks with the rotating magnetic field thereby generating an induced electromotive voltage. The induced electromotive voltage causes an induced current to flow through the squirrel-cage rotor conductor forming a closed circuit, and a magnetic pole is generated in the rotor core. The magnetic pole in the rotor core and the magnetic pole in the rotating magnetic field interact with each other subjecting the rotor core to a force in a direction tangent to the outer peripheral surface of the rotor core. This force is the output torque from the rotor shaft.

A current flowing through the stator coil and the rotor conductor causes a copper loss that is equivalent to the product of a resistance value of the conductor and the square of the current value. Such a copper loss increases the temperature in the stator coil and the rotor conductor. A magnetic flux resulting from a current flowing through the stator coil and the rotor conductor passes through the stator core and the rotor core.

An alternating magnetic flux, passing through the stator core and the rotor core, causes an iron loss and increases the temperature in the stator core and the rotor core. Any harmonic components in the voltage and the current fed to the main motor causes a harmonic loss and increases the temperature in the stator coil, the rotor conductor, the stator core, and the rotor core. As described above, various losses increase the interior temperature of the main motor during the operation of the main motor.

To cool the inside of the main motor during operation, the main motor includes a fan attached to the rotor shaft of the main motor, and has an air inlet at a position opposite to the fan from the core to take in exterior air through a housing, and an air outlet at a position outside the outer periphery of the fan to allow the interior air to exit. The rotor rotates to rotate the fan during the operation of the main motor, thereby producing a pressure difference between the outer periphery and the inner periphery of the blades in the fan. The pressure difference draws air through the air inlet to flow through an air passage in the rotor core and a gap between the rotor core and the stator core, and to exit through the air outlet. The air taken in through the air inlet cools the inside of the main motor.

The air taken in through the air inlet and exiting through the air outlet collides with an edge of the air outlet, thereby generating exhaust noise. A main motor for railway vehicles described in Patent Literature 1 includes a bracket with a negative pressure relief hole on one end of a frame that receives a stator on the inner periphery. The frame has, in a lower portion of the frame end, an outlet for air from an exhaust fan. At an inner surface of the bracket, a first narrow gap is left between the outer periphery of the negative pressure relief hole and the exhaust fan to reduce noise generated through the relief hole out of the motor.

CITATION LIST

Patent Literature

Patent Literature 1: Unexamined Japanese Patent Application Kokai
Publication No. H11-146605

SUMMARY OF INVENTION

Technical Problem

Patent Literature 1 describes the motor with a larger air outlet and including an exhaust fan with a larger outer diameter. Although selecting an exhaust fan with a larger outer diameter increases the flow rate of air taken into the main motor to improve cooling performance, the fan generates larger exhaust noise. Although a main motor operating at a higher rotation speed increases the flow rate of air taken into the main motor to improve cooling performance, the motor also generates larger exhaust noise. Although selecting a fan with a smaller outer diameter to increase the distance between the outer periphery of the blades in the fan and the air outlet can reduces the exhaust noise, the fan draws less air into the main motor and lowers cooling performance.

In consideration of the aforementioned circumstances, an objective of the present disclosure is to reduce exhaust noise while improving cooling performance of a main motor for a vehicle.

Solution to Problem

In order to attain the aforementioned objective, a main motor for a vehicle according to the disclosure includes a frame fixed to the boogie in the vehicle, a rotor shaft received in the frame, a rotor core, a rotor conductor, a stator core, a stator coil, a first bearing box, a second bearing box, and a fan. The rotor core is fitted on the rotor shaft and rotatable integrally with the rotor shaft. The rotor conductor is retained in the rotor core. The stator core is attached to an inner peripheral surface of the frame and faces an outer peripheral surface of the rotor core across a gap. A stator coil is retained in the stator core. The first bearing box and the second bearing box are attached to the frame and face each other in a direction along the rotor shaft across the rotor core and the stator core. The first bearing box and the second bearing box each retain a bearing supporting the rotor shaft in a rotatable manner. The fan is attached to the rotor shaft between the first bearing box and the rotor core and rotatable integrally with the rotor shaft. The fan includes blades. The frame has, in a portion of the frame to which the second bearing box is attached or in a portion of the frame facing the second bearing box, an air inlet for taking in exterior air around the frame. The first bearing box has, in an end face of the first bearing box that is one of end faces perpendicular to the direction along the rotor shaft and is farther from the fan, an air outlet for air taken in through the air inlet to exit. The first bearing box includes a cylindrical portion continuous with the end face farther from the fan. The cylindrical portion has an outer peripheral surface facing the inner peripheral surface of the frame across a gap defining a flow channel for the air. The air taken in through the air inlet passes through the gap between the outer peripheral surface of the rotor core and the stator core, the fan, and the flow channel between the outer peripheral surface of the cylindrical portion of the first bearing box and the inner peripheral surface of the frame and exits through the air outlet. A value obtained by dividing a distance between an outer periphery of the blades in the fan and the air outlet by an outer radius of the blades is greater than or equal to a threshold.

Advantageous Effects of Invention

The main motor for a vehicle according to the above aspect of the present disclosure includes the bearing box with the air outlet in the end face, and is provided with a value obtained by dividing the distance between the outer periphery of the blades in the fan and the air outlet by the outer radius of the blades to greater than or equal to the threshold thereby reducing exhaust noise while improving cooling performance inside the vehicle main motor.

BRIEF DESCRIPTION OF DRAWINGS

FIG. 12 is a partial cross-sectional view of the main motor for a vehicle according to Embodiment 2;

DESCRIPTION OF EMBODIMENTS

Figure 1:
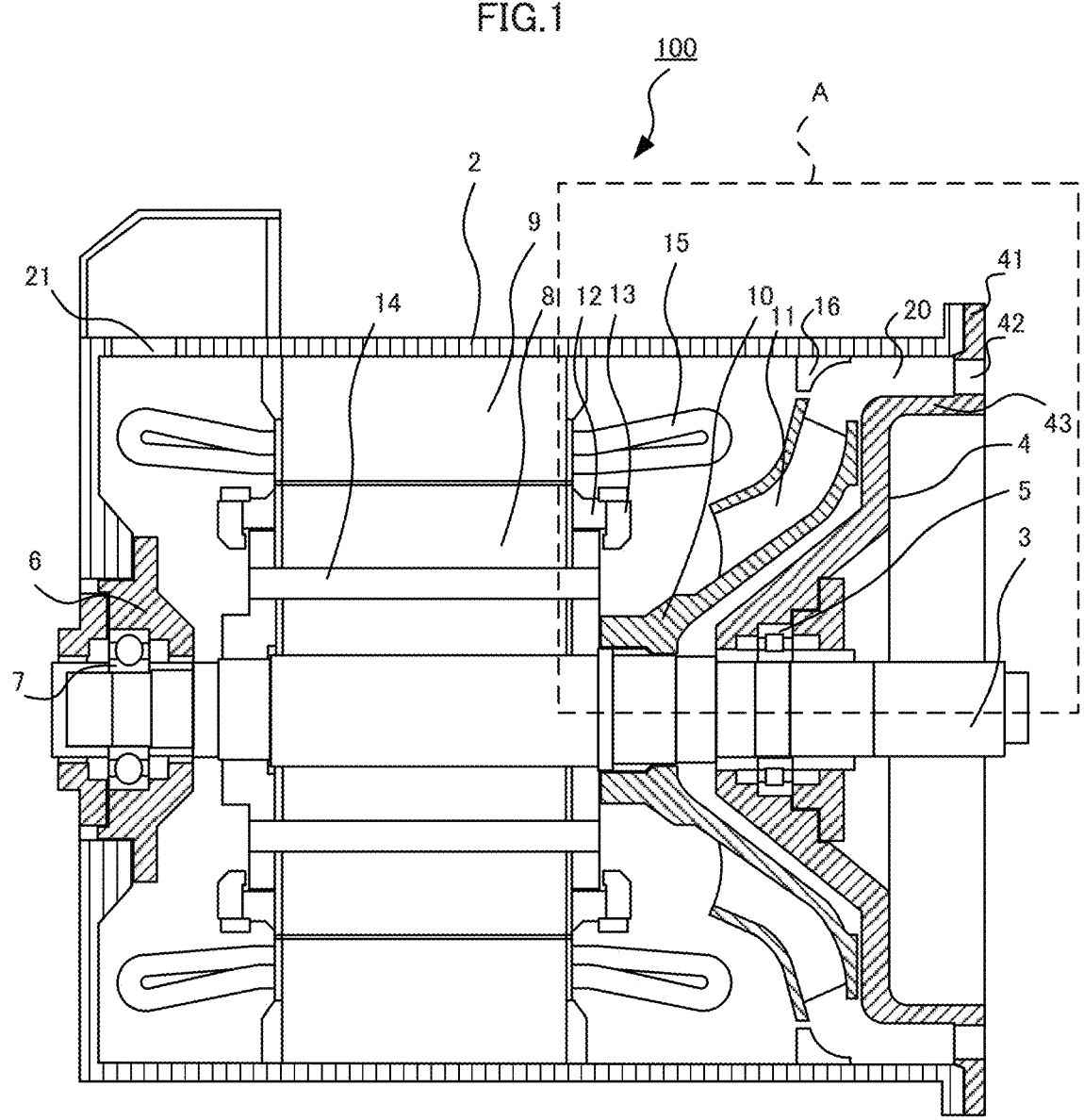
FIG. 1 is a cross-sectional view of a main motor for a vehicle according to Embodiment 1 of the present disclosure.

Embodiments of the present disclosure are described in detail with reference to the drawings. The same or corresponding components in the figures are given the same reference numerals.

Embodiment 1

Figure 2:
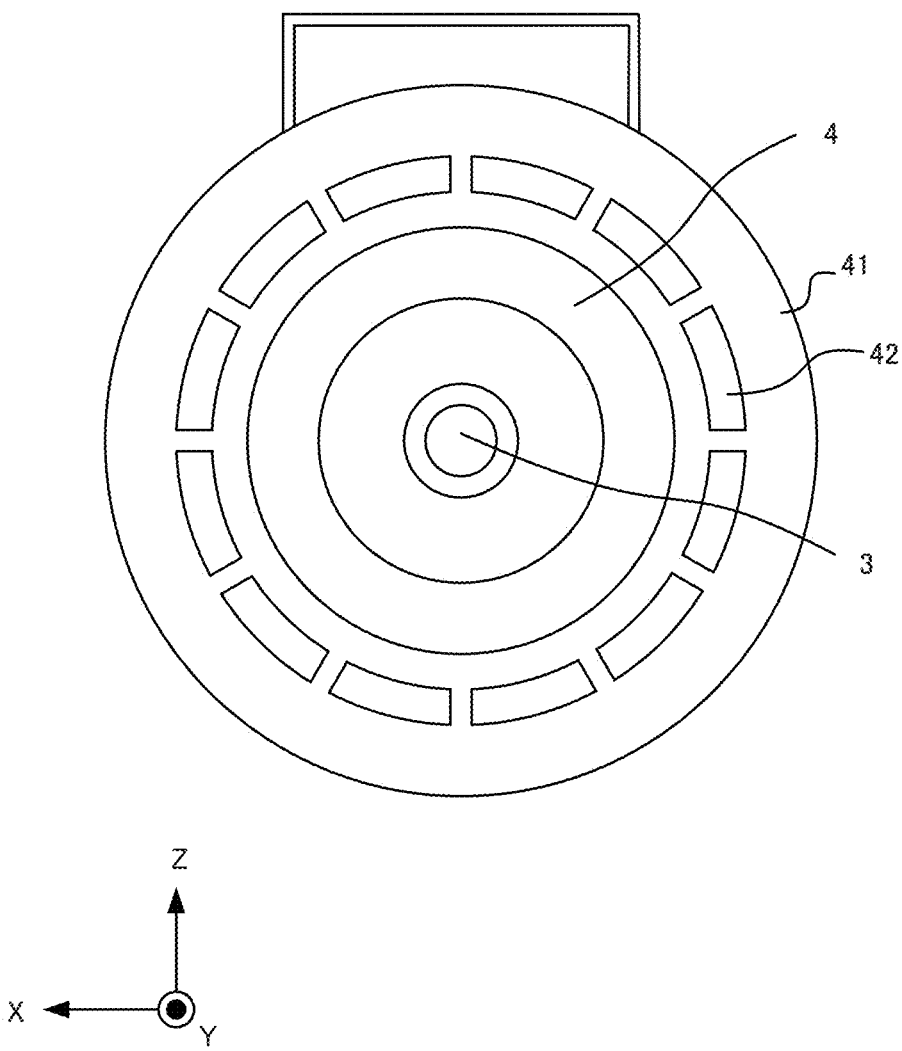
FIG. 2 is a side view of the main motor for a vehicle according to Embodiment 1.

FIG. 1 is a cross-sectional view of a main motor for a vehicle according to Embodiment 1 of the present disclosure. FIG. 1 is a cross-sectional view taken along a plane parallel to a rotor shaft 3. FIG. 2 is a side view of the main motor for a vehicle according to Embodiment 1. A vehicle main motor 100 includes a frame 2 fixed to a vehicle, the rotor shaft 3 received in the frame 2, a first bearing box 4 and a second bearing box 6 attached to the frame 2, a rotor core 8 fitted on the rotor shaft 3, a stator core 9 attached to the inner peripheral surface of the frame 2, and a fan 10 attached to the rotor shaft 3. Z-axis refers to a vertical direction, X-axis refers to the traveling direction of the vehicle on which the vehicle main motor 100 is mounted, and Y-axis is a direction perpendicular to X-axis and Z-axis. The rotor shaft 3 extends in X-axis direction in the vehicle main motor 100 when fixed on, for example, a vehicle body. The rotor shaft 3 extends in Y-axis direction in the vehicle main motor 100 when fixed on, for example, a bogie in a vehicle. The vehicle main motor 100 is mounted on, for example, an electric railway vehicle. In FIG. 1 and subsequent figures, X-axis, Y-axis, and Z-axis indicate the respective directions of the vehicle main motor 100 when mounted on a bogie in a vehicle.

The first bearing box 4 and the second bearing box 6 face each other in Y-axis direction across the rotor core 8 and the stator core 9. The first bearing box 4 and the second bearing box 6 respectively retaining bearings 5 and 7 to support the rotor shaft 3 in a rotatable manner are attached to the frame 2. In the example shown in FIG. 1, the frame 2 has an opening in one face of the frame 2 perpendicular to Y-axis direction. The first bearing box 4 is fastened to the frame 2 in Y-axis direction to close the opening. The frame 2 has a through-hole in the other face of the frame 2 perpendicular to Y-axis direction. The second bearing box 6 is fastened to the frame 2 surrounding the through-hole in Y-axis direction to close the through-hole. The rotor core 8 is fitted on the rotor shaft 3 and is rotatable integrally with the rotor shaft 3. The stator core 9 faces the outer peripheral surface of the rotor core 8 across a gap. The fan 10 includes blades 11. The fan 10 is attached to the rotor shaft 3 between the first bearing box 4 and the rotor core 8 and is rotatable integrally with the rotor shaft 3.

The frame 2 has, in a portion receiving the second bearing box 6 or in a portion facing the second bearing box 6, an air inlet 21 to take in exterior air. In FIG. 1, the air inlet 21 is formed in an upper surface of the frame 2 in the vertical direction, but may be formed at another location. The air inlet 21 may be formed in an end face of the frame 2 perpendicular to the rotor shaft 3 and receiving the second bearing box 6. The first bearing box 4 has, in an end face 41 of the first bearing box 4 that is one of end faces perpendicular to Y-axis direction and is farther from the fan 10, an air outlet 42 for air taken in through the air inlet 21 to exit. In the example shown in FIG. 1, the end face 41 is fastened to the frame 2 in Y-axis direction. The first bearing box 4 includes a cylindrical portion 43 continuous with the end face 41 and having an outer peripheral surface facing the inner peripheral surface of the frame 2 across a gap defining an air flow channel 20. In the example shown in Embodiment 1, the cylindrical portion 43 of the first bearing box 4 extends in the direction along the rotor shaft 3. The cylindrical portion 43 of the first bearing box 4 defines the flow channel 20 with a constant cross-sectional area along a plane perpendicular to Y-axis direction to prevent a vortex due to the cylindrical shape.

The rotor core 8 has, on the outer periphery, slots cut in the direction along the rotor shaft 3 to receive rotor bars 12. Each rotor bar 12 has both ends bonded to short-circuit rings 13 that are conductors with annular cross sections perpendicular to Y-axis direction for electrically connecting the rotor bars 12 together. The rotor core 8 has an air passage 14 for air flowing. The stator core 9 receives stator coils 15.

To smooth a change in the direction of the air flow, the frame 2 may include an air guide 16 on the inner peripheral surface as shown in FIG. 1. The inclusion of the air guide 16 reduces a turbulence or a vortex that can occur when direction of the air flow is changed, and reduces air pressure loss. Reducing the air pressure loss increases air intake, and thus improves cooling performance.

Figure 3:
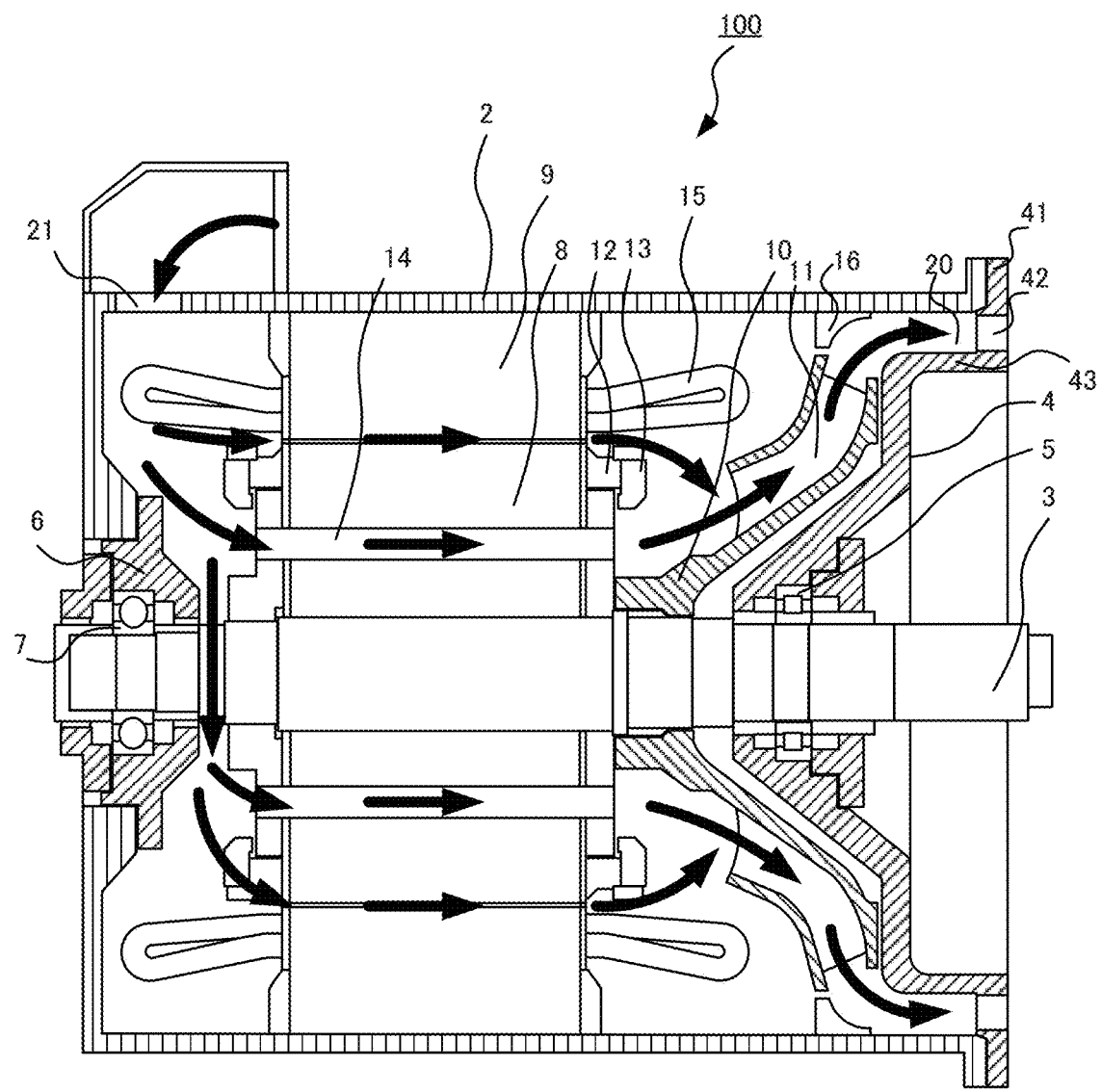
FIG. 3 is a diagram illustrating a flow of air in the main motor for a vehicle according to Embodiment 1.

FIG. 3 is a diagram illustrating the flow of air in the main motor for a vehicle according to Embodiment 1. In FIG. 3, the solid arrows indicate a flow of air in the vehicle main motor 100 shown in FIG. 1. The rotor shaft 3 rotates during the operation of the vehicle main motor 100. The rotor shaft 3 rotates to rotate the fan 10 fitted on the rotor shaft 3. The fan 10 rotates to produce a pressure difference between the inner periphery and the outer periphery of the blades 11, drawing in air through the air inlet 21. In the example illustrated in FIG. 3, exterior air around the vehicle main motor 100 is taken into the vehicle main motor 100 through the air inlet 21. The air taken into the vehicle main motor 100 flows through the gap between the outer peripheral surface of the rotor core 8 and the stator core 9, and through the air passage 14 and reaches the fan 10. The air from the fan 10 passes through the flow channel 20 and exits through the air outlet 42. As described above, exterior air around the vehicle main motor 100 is taken into the vehicle main motor 100 and flows through the inside of the vehicle main motor 100 and out of the vehicle main motor 100 to cool the inside of the vehicle main motor 100. The air exiting through the air outlet 42 generates exhaust noise. The structure of the vehicle main motor 100 that reduces such exhaust noise is described.

Figure 4:
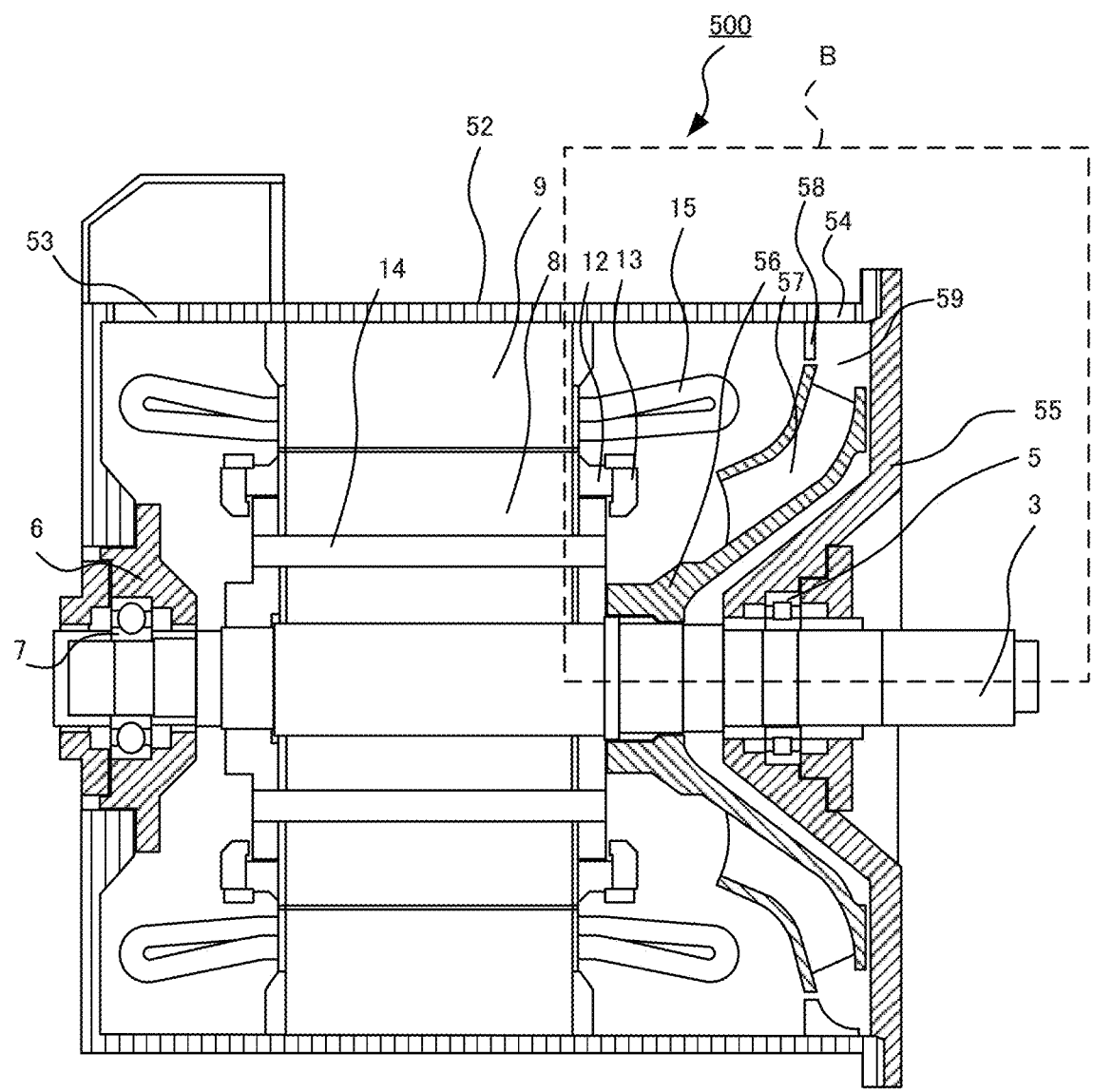
FIG. 4 is a cross-sectional view of a main motor for a vehicle.
Figure 4:
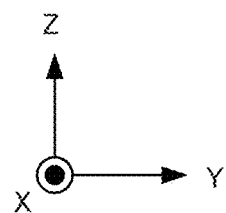

FIG. 4 is a cross-sectional view of a main motor for a vehicle. A vehicle main motor 500 shown in FIG. 4 differs from the vehicle main motor 100 according to Embodiment 1 of the present disclosure in that a frame 52 outside the outer periphery of blades 57 in a fan 56 has an air outlet 54. A first bearing box 55 and the second bearing box 6 face each other in Y-axis direction across the rotor core 8 and the stator core 9. The first bearing box 55 and the second bearing box 6 respectively retaining bearings 5 and 7 to support the rotor shaft 3 in a rotatable manner are attached to the frame 52. The fan 56 includes the blades 57. The fan 56 is attached to the rotor shaft 3 between the first bearing box 55 and the rotor core 8 and is rotatable integrally with the rotor shaft 3. The vehicle main motor 500 includes an air guide 58 for guiding air from the fan 56 toward the air outlet 54. The inclusion of the air guide 58 prevents air from the fan 56 from reaching an air inlet side of the fan 56 again after being redirected toward the stator coil 15. A flow channel 59 is defined between the face of the first bearing box 55 perpendicular to Y-axis direction and the air guide 58.

Figure 5:
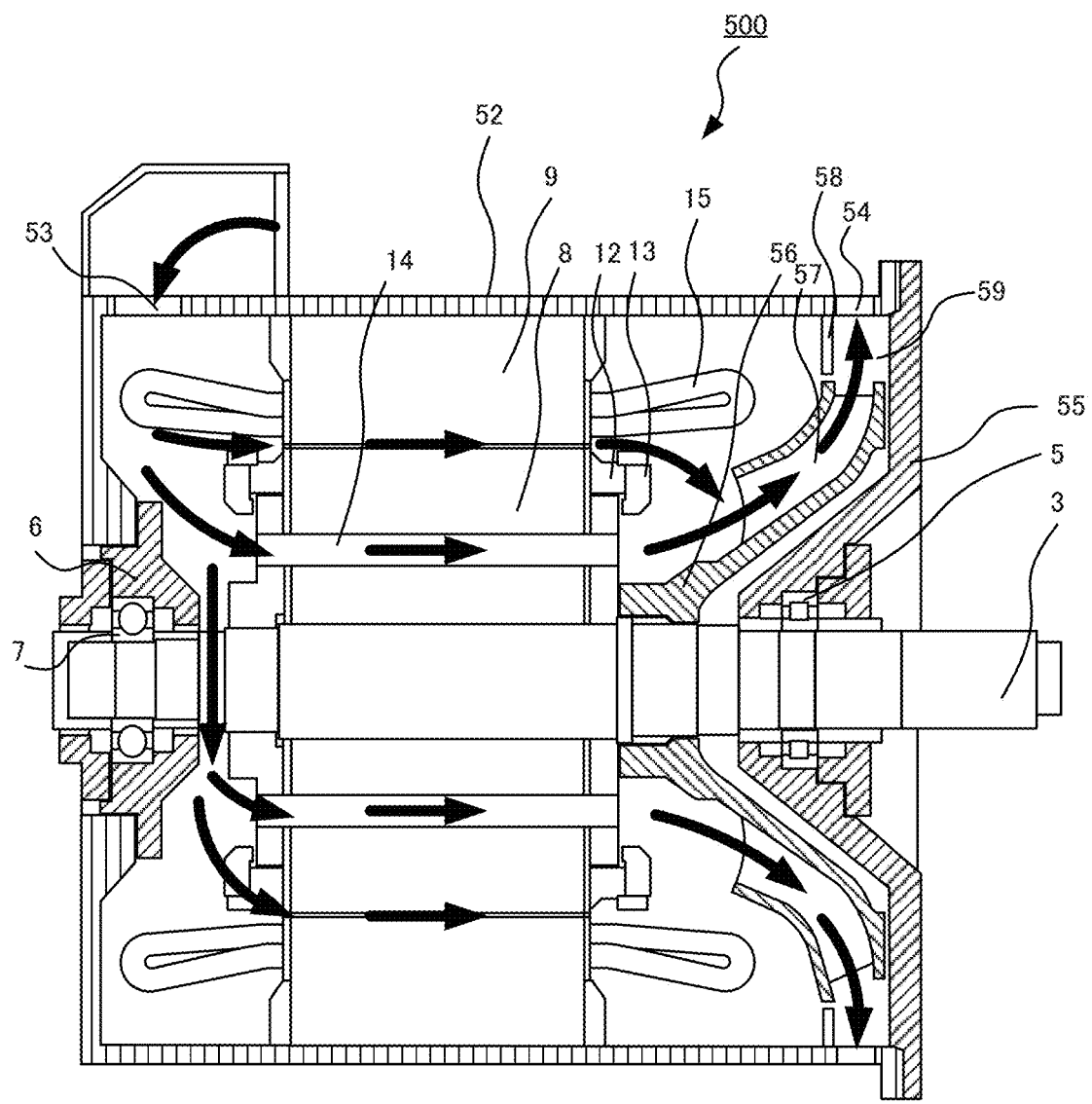
FIG. 5 is a diagram illustrating the flow of air in the main motor for a vehicle.

FIG. 5 is a diagram illustrating the flow of air in the main motor for a vehicle. In FIG. 5, the solid arrows indicate the flow of air in the vehicle main motor 500 shown in FIG. 4. The rotor shaft 3 rotates during the operation of the vehicle main motor 500. The rotor shaft 3 rotates to rotate the fan 56 fitted on the rotor shaft 3. The fan 56 rotates to produce a pressure difference between the inner periphery and the outer periphery of the blades 57, drawing in air through an air inlet 53. The air taken into the vehicle main motor 500 flows through the gap between the outer peripheral surface of the rotor core 8 and the stator core 9, and through the air passage 14 and reaches the fan 56. The air from the fan 56 passes through the flow channel 59 and exits through the air outlet 54. The air exiting through the air outlet 54 generates exhaust noise.

Figure 6:
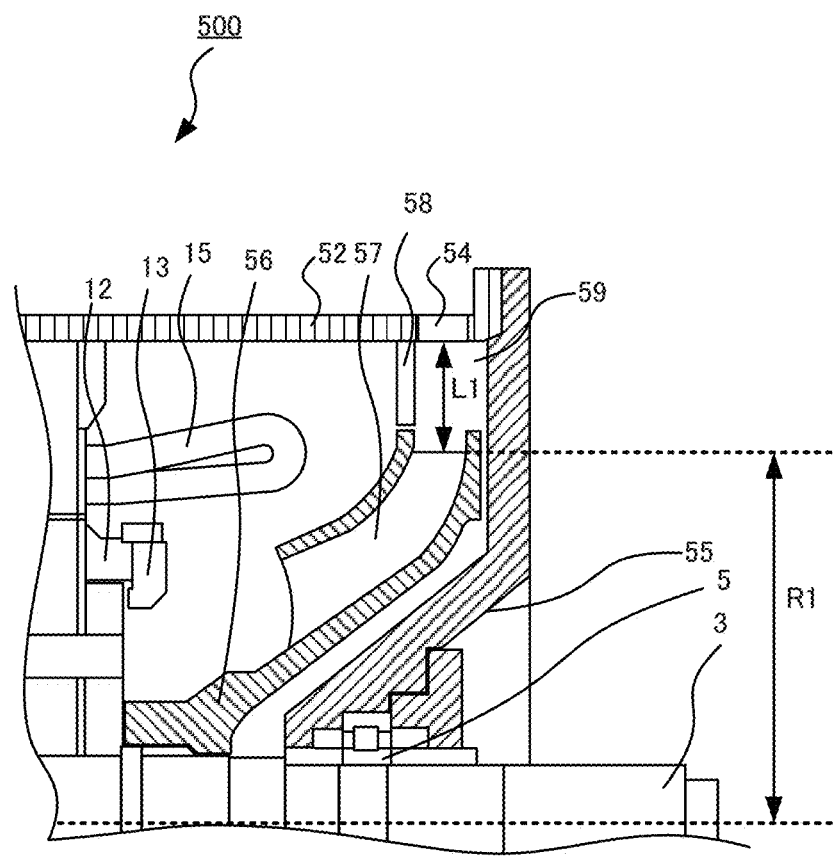
FIG. 6 is a partial cross-sectional view of the main motor for a vehicle.

FIG. 6 is a partial cross-sectional view of the main motor for a vehicle. FIG. 6 is an enlarged view of an area B shown in FIG. 4. The distance between the outer periphery of the blades 57 in the fan 56, that is an end of the blades 57 nearer to the air outlet 54, and the air outlet 54 is referred to as L1, and the outer radius of the blades 57 is referred to as R1. As the distance L1 is smaller with respect to the outer radius R1, the air has a larger velocity distribution when reaching the air outlet 54. This increases the likelihood that a turbulence or a vortex occurs as the air collides with the edge of the air outlet 54. A turbulence or a vortex can increase exhaust noise. As the distance L1 is larger with respect to the outer radius R1, the air has a smaller velocity distribution when reaching the air outlet 54. This decreases the likelihood that a turbulence or a vortex occurs as the air collides with the edge of the air outlet 54. In other words, when the gap ratio defined as L1/R1 changes, the magnitude of exhaust noise changes.

Figure 7:
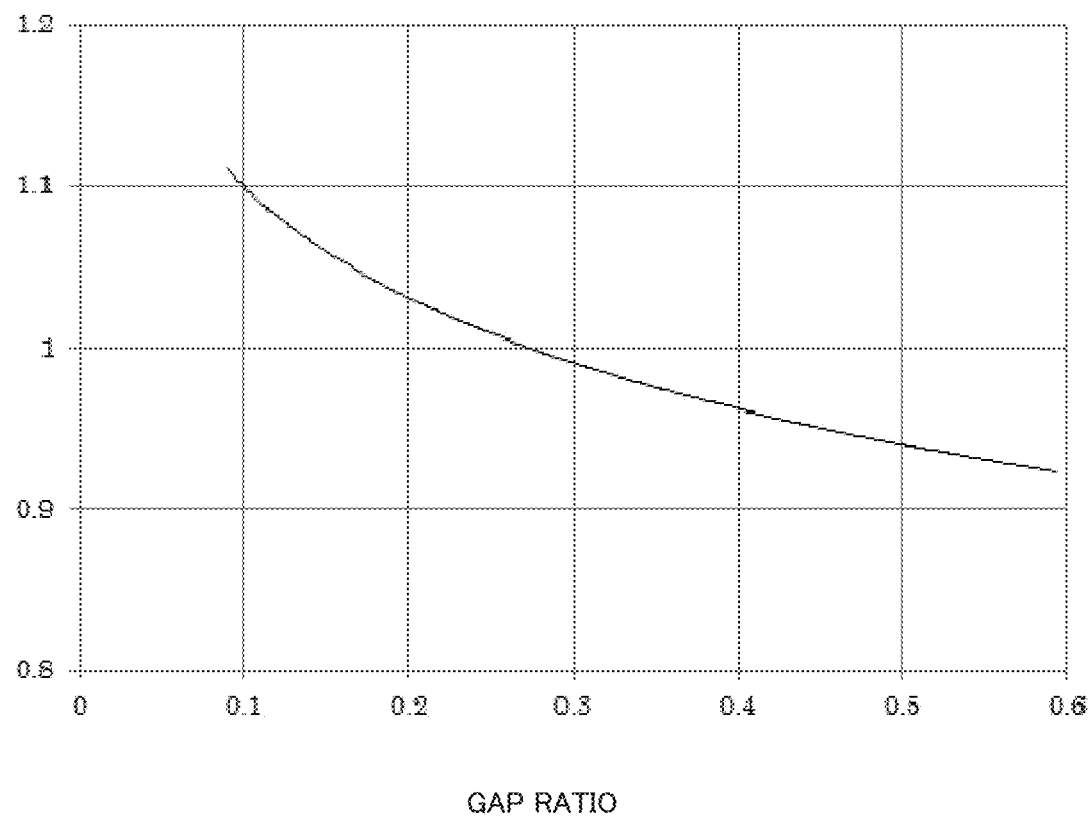
FIG. 7 is a graph showing an example relationship between a gap ratio and a noise level ratio.

FIG. 7 is a graph showing an example relationship between the gap ratio and a noise level ratio. The level of the exhaust noise during the operation of the vehicle main motor 500 is measured with a known noise meter. The noise level ratio in FIG. 7 is a ratio obtained by dividing the measurement value (dB) obtained with the noise meter by a target value (dB) for the exhaust noise level. In other words, the exhaust noise with a noise level ratio of 1 matches the target value for the noise level. The measurement value indicating the exhaust noise represents a maximum value among the measurement values obtained during a predetermined period. In FIG. 7, the horizontal axis shows the gap ratio and the vertical axis shows the noise level ratio. The graph shown in FIG. 7 shows a fitted curve representing a relationship between the gap ratio and the noise level ratio derived from the gap ratio and the noise level ratio calculated using a measurement value indicating the noise level. The fitted curve in FIG. 7 is obtained by measuring exhaust noise for different vehicle main motors 500 including the blades 57 with varying outer peripheries in the fan 56 and thus having different distances between the outer periphery of the blades 57 in the fan 10 and the air outlet 54. The measurement results are then used to calculate the exhaust noise at the same air flow rate. As shown in FIG. 7, increasing the gap ratio enables reducing the exhaust noise. The distance between the rotor shaft 3 and the air outlet 54 cannot be increased due to space limitation for the vehicle main motor 500. Thus, to increase the gap ratio, the outer radius of the blades 57 is to be reduced. However, the blades 57 with a reduced outer radius can lower cooling performance, and can increase the temperature in the vehicle main motor 500.

Figure 8:
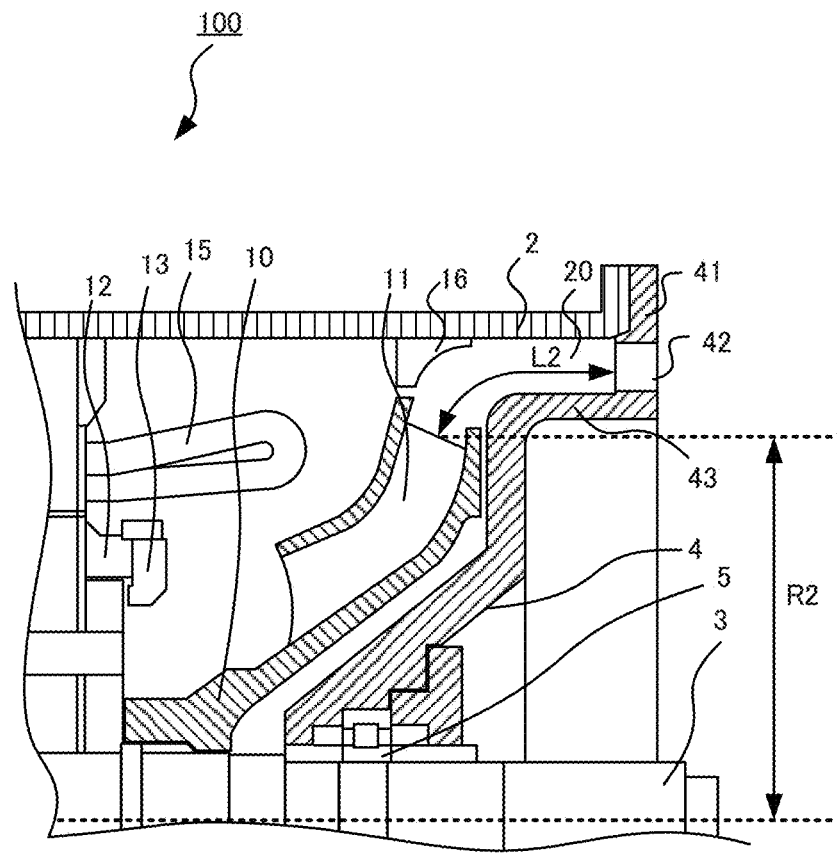
FIG. 8 is a partial cross-sectional view of the main motor for a vehicle according to Embodiment 1.
Figure 8:
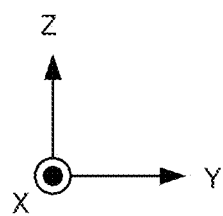

FIG. 8 is a partial cross-sectional view of the main motor for a vehicle according to Embodiment 1. FIG. 8 is an enlarged view of an area A shown in FIG. 1. A value obtained by dividing the distance L2 between the outer periphery of the blades 11 in the fan 10 and the air outlet 42 by the outer radius R2 of the blades 11 is greater than or equal to a threshold. Considering the relationship between the gap ratio and the noise level ratio shown in FIG. 7, the threshold may be 0.3 or greater. More specifically, the value obtained by dividing the distance L2 between the outer periphery of the blades 11 and the air outlet 42 by the outer radius R2 of the blades 11 may be 0.3 or greater. The vehicle main motor 100 according to Embodiment 1 of the present disclosure is provided with the value obtained by dividing the distance L2 between the outer periphery of the blades 11 in the fan 10 and the air outlet 42 by the outer radius R2 of the blades 11 greater than or equal to the threshold, and thus can reduce exhaust noise. The vehicle main motor 100 with the flow channel 20 extending in Y-axis direction can have the blades 11 with a larger outer radius than the outer radius of the blades 57 in the vehicle main motor 500 in FIG. 6, without increasing the length of the vehicle main motor 100 in Z-axis direction. More specifically, having the flow channel 20 extending in Y-axis direction to increase the gap ratio, the vehicle main motor 100 reduces exhaust noise while improving cooling performance.

Figure 9:
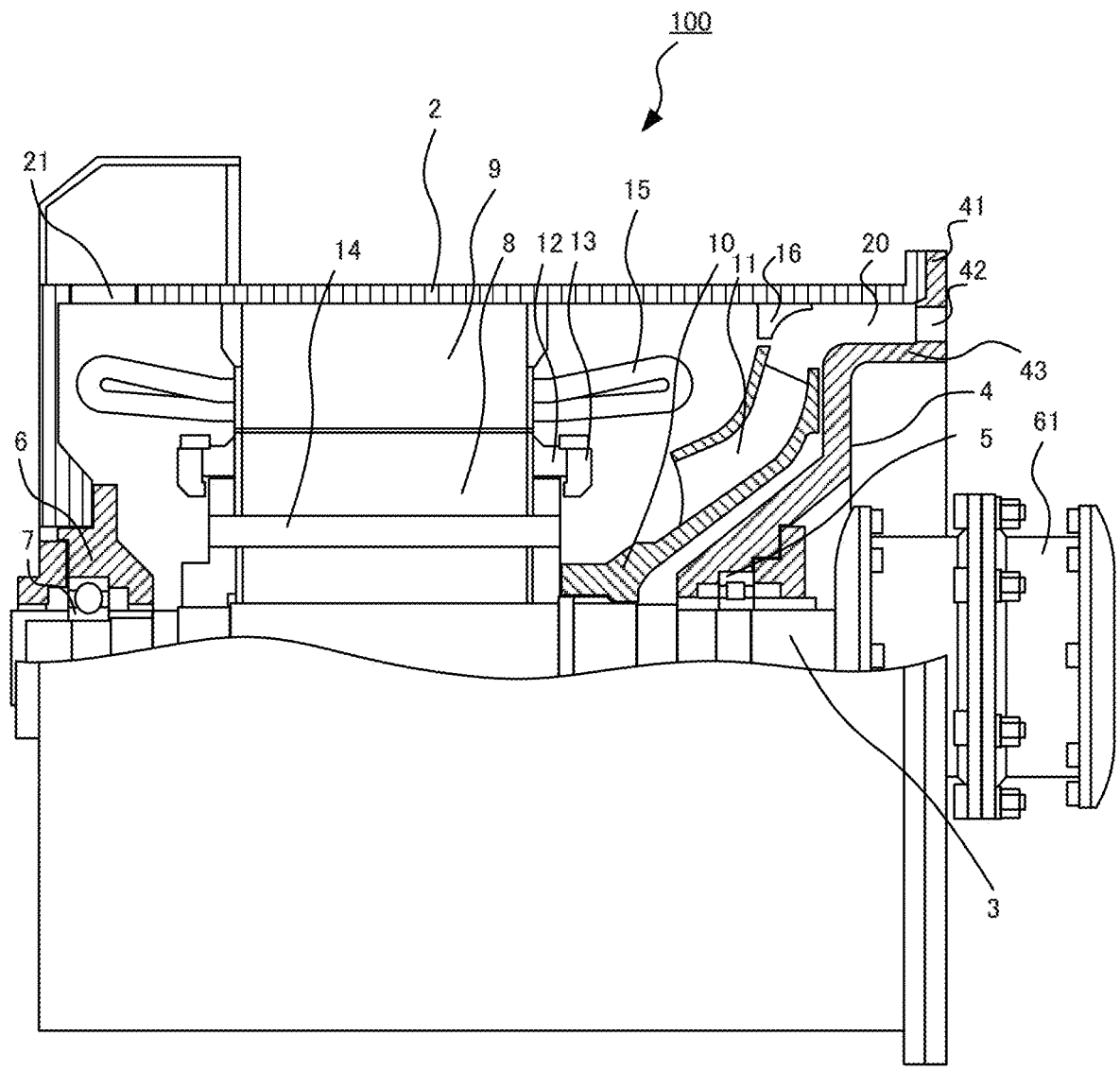
FIG. 9 is a cross-sectional view of the main motor for a vehicle according to Embodiment 1.

FIG. 9 is a cross-sectional view of the main motor for a vehicle according to Embodiment 1. The rotor shaft 3 of the vehicle main motor 100 receives a coupling 61 that transfers the rotation of the vehicle main motor 100 to a drive device. The coupling 61 is attached to the rotor shaft 3 at a position where a portion of the outer peripheral surface of the coupling 61 faces the inner peripheral surface of the first bearing box 4 of the vehicle main motor 100. More specifically, a portion of the outer peripheral surface of the coupling 61 is covered with the first bearing box 4. This prevents any scattered debris from entering a gap between the vehicle main motor 100 and the coupling 61 while the vehicle is traveling, and prevents damage on the vehicle main motor 100 as well as on the coupling 61.

As described above, the vehicle main motor 100 according to Embodiment 1 of the present disclosure includes the first bearing box 4 with the air outlet 42 in the end face 41, and is provided with the value obtained by dividing the distance between the outer periphery of the blades 11 in the fan 10 and the air outlet 42 by the outer radius of the blades 11 to greater than or equal to the threshold to reduce exhaust noise while improving cooling performance inside the vehicle main motor 100.

Embodiment 2

Figure 10:
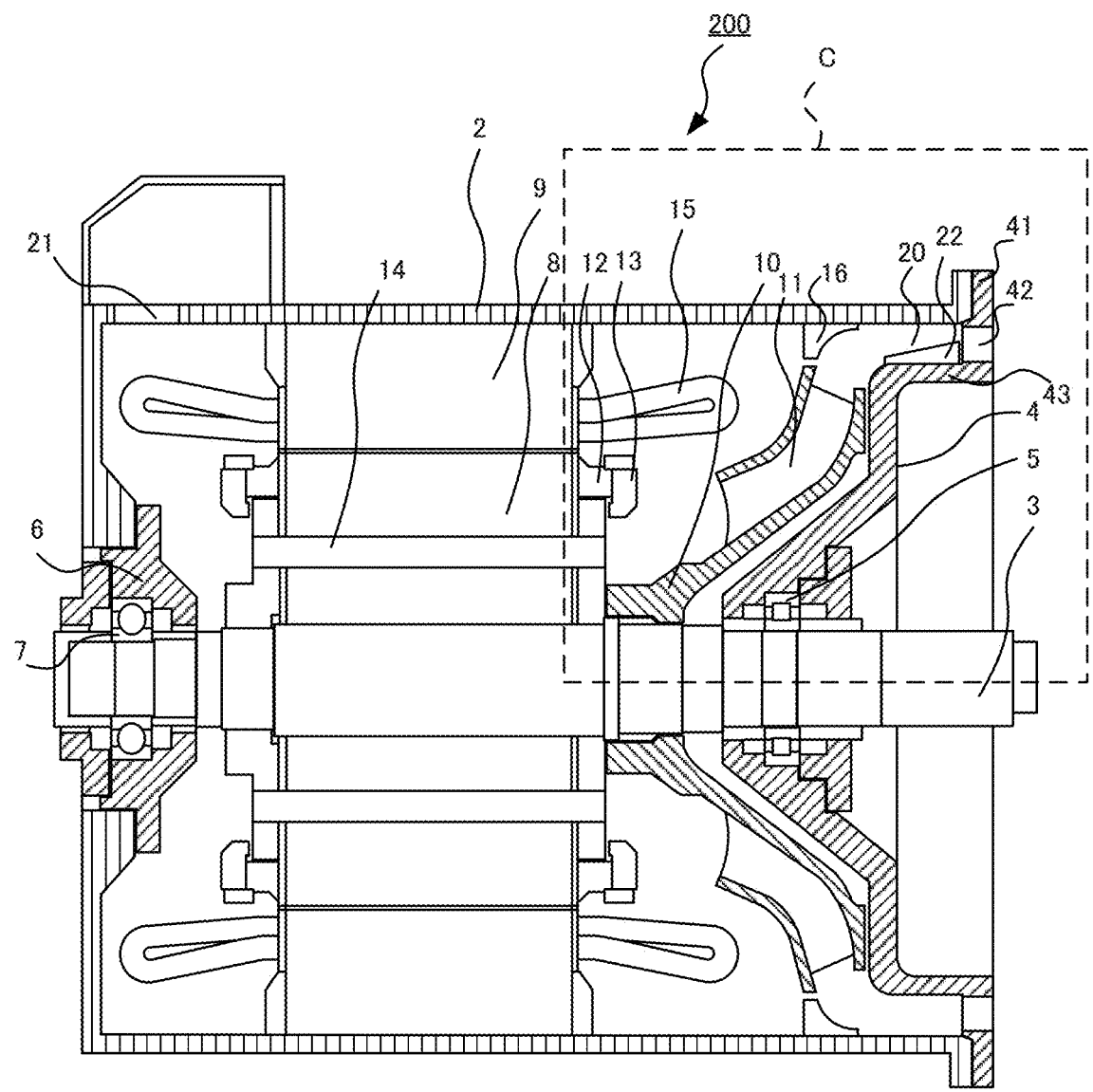
FIG. 10 is a cross-sectional view of a main motor for a vehicle according to Embodiment 2 of the present disclosure.
Figure 11:
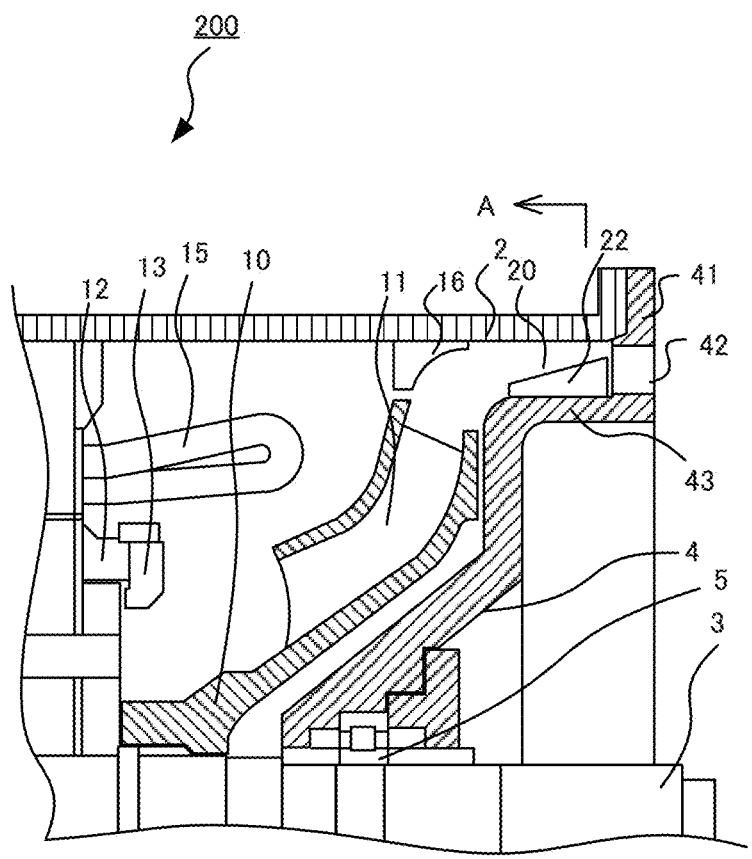
FIG. 11 is a partial cross-sectional view of the main motor for a vehicle according to Embodiment 2.

FIG. 10 is a cross-sectional view of a main motor for a vehicle according to Embodiment 2. FIG. 11 is a partial cross-sectional view of the main motor for a vehicle according to Embodiment 2. FIG. 11 is an enlarged view of an area C shown in FIG. 10. A vehicle main motor 200 according to Embodiment 2 further includes a first airflow regulating plate 22 extending in Y-axis direction on an outer peripheral surface of a cylindrical portion 43 of the first bearing box 4, in addition to the components in the vehicle main motor 100 according to Embodiment 1. The vehicle main motor 200 may include any number of first airflow regulating plates 22. FIG. 12 is a partial cross-sectional view of the main motor for a vehicle according to Embodiment 2. FIG. 12 is a cross-sectional view taken along line A-A in FIG. 11. In the example shown in FIG. 12, a plurality of first airflow regulating plates 22 is circumferentially arranged at regular intervals on the outer peripheral surface of the cylindrical portion 43 of the first bearing box 4. The inclusion of the first airflow regulating plates 22 reduces the velocity components of air flowing through the flow channel 20 in the rotational direction about the rotor shaft 3. When the air flowing obliquely in the rotational direction about the rotor shaft 3 with respect to Y-axis direction collides with the edge of the air outlet 42, an air vortex forms and generates exhaust noise. The first airflow regulating plates 22 reduce the velocity components of air flowing through the flow channel 20 in the rotational direction about the rotor shaft 3. The first airflow regulating plates 22 thus rectify air flow reaching the air outlet 42 into substantially laminar flow. The substantially laminar flow reaching the air outlet 42 prevents an air vortex and reduces exhaust noise.

In the example shown in FIG. 12, a plurality of first airflow regulating plates 22 is circumferentially arranged at regular intervals on the outer peripheral surface of the cylindrical portion 43 of the first bearing box 4. In some embodiments, the first airflow regulating plates 22 may be circumferentially arranged at irregular intervals on the outer peripheral surface of the cylindrical portion 43 of the first bearing box 4. The first airflow regulating plates 22 circumferentially arranged at irregular intervals on the outer peripheral surface of the cylindrical portion 43 of the first bearing box 4 reduce resonance produced in the vehicle main motor 200, and prevent an increase in the exhaust noise due to resonance.

The first airflow regulating plates 22 may each have a uniform height in the direction perpendicular to the rotor shaft 3, or may have a larger height toward the air outlet 42. The first airflow regulating plate 22 having a larger height toward the air outlet 42 in the direction perpendicular to the rotor shaft 3 more effectively rectifies air flow toward the air outlet 42, and prevents an increase in the exhaust noise.

As described above, the vehicle main motor 200 according to Embodiment 2 of the present disclosure includes the first airflow regulating plates 22 arranged on the outer peripheral surface of the cylindrical portion 43 of the first bearing box 4 to reduce exhaust noise.

Embodiment 3

Figure 13:
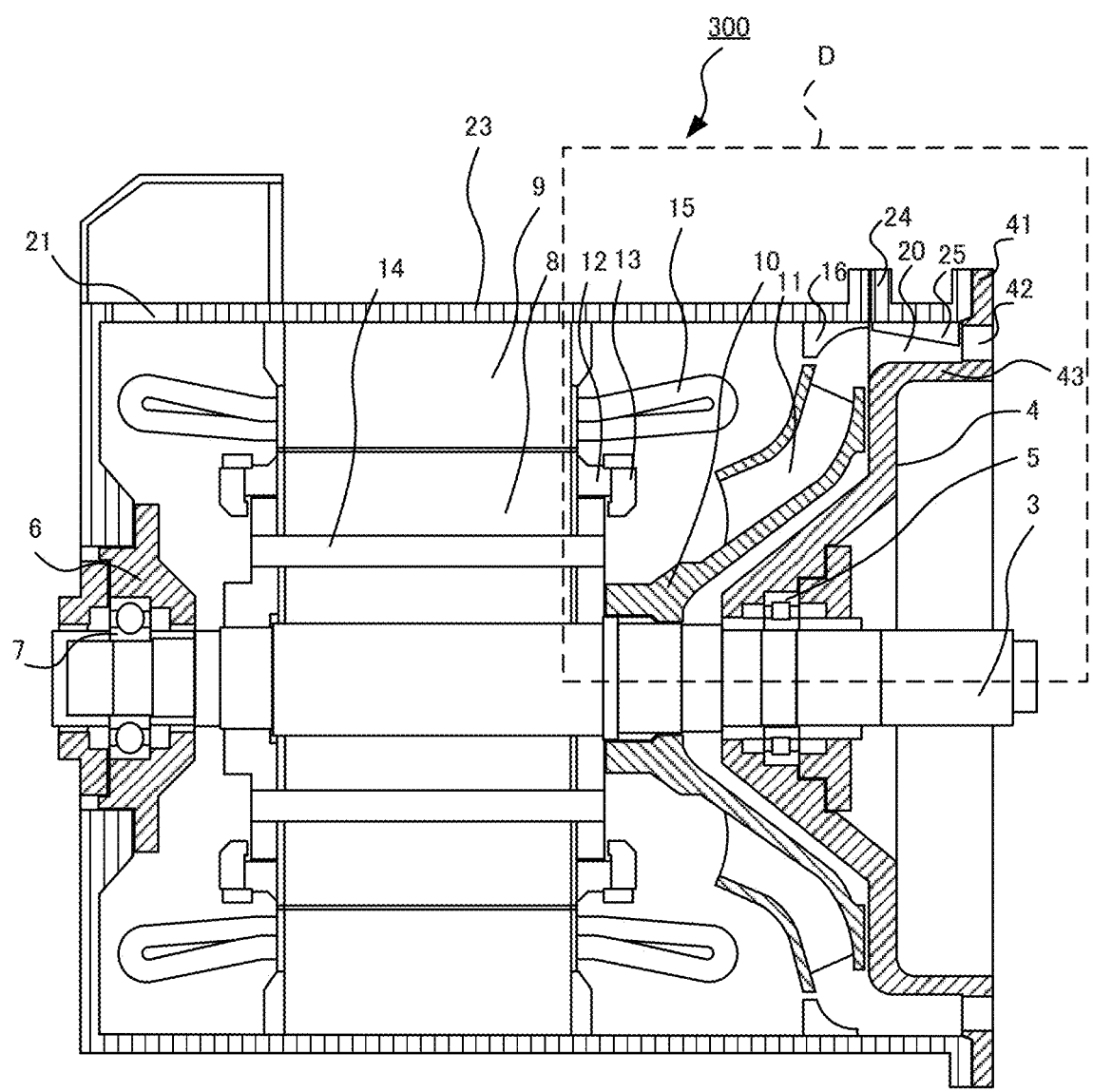
FIG. 13 is a cross-sectional view of a main motor for a vehicle according to Embodiment 3 of the present disclosure.
Figure 13:
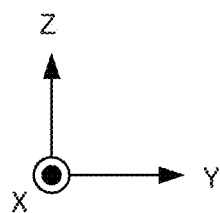
Figure 14:
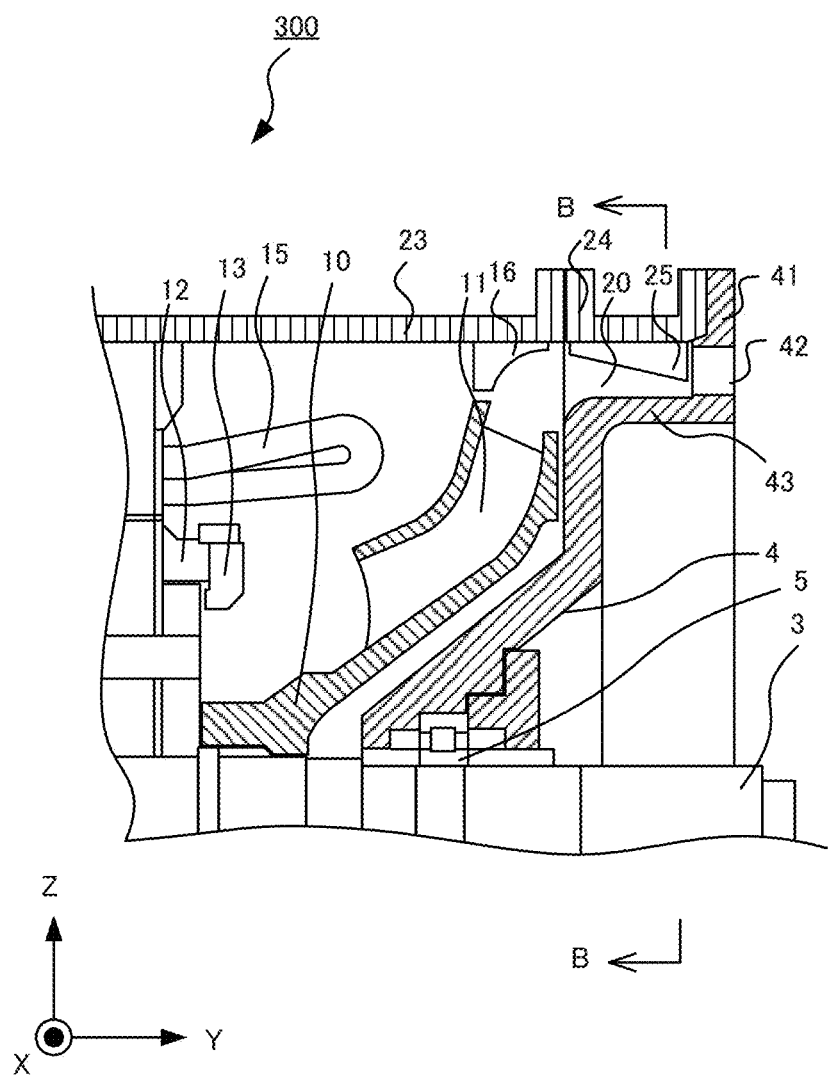
FIG. 14 is a partial cross-sectional view of the main motor for a vehicle according to Embodiment 3.

FIG. 13 is a cross-sectional view of a main motor for a vehicle according to Embodiment 3. FIG. 14 is a partial cross-sectional view of the main motor for a vehicle according to Embodiment 3. FIG. 14 is an enlarged view of an area D shown in FIG. 13. A vehicle main motor 300 according to Embodiment 3 includes a main frame 23 and a joint frame 24, in place of the frame 2 in the vehicle main motor 100 according to Embodiment 1. The stator core 9 is attached to the inner peripheral surface of the main frame 23. The joint frame 24 is adjacent to the main frame 23 in Y-axis direction. The first bearing box 4 is attached to the joint frame 24. In the example shown in FIG. 13, the main frame 23 has a through-hole in one face of the main frame 23 perpendicular to Y-axis direction. The second bearing box 6 is fastened to the main frame 23 surrounding the through-hole in Y-axis direction to close the through-hole. The main frame 23 has an opening at the other face perpendicular to Y-axis direction. The joint frame 24 is fastened to the main frame 23 in Y-axis direction. The flow channel 20 is defined between the outer peripheral surface of the cylindrical portion 43 of the first bearing box 4 and the inner peripheral surface of the joint frame 24. In the example shown in FIG. 13, the air guide 16 is arranged on the inner peripheral surface of the main frame 23. The air guide 16 has an end nearer the air outlet 42 at the joint between the main frame 23 and the joint frame 24.

Figure 15:
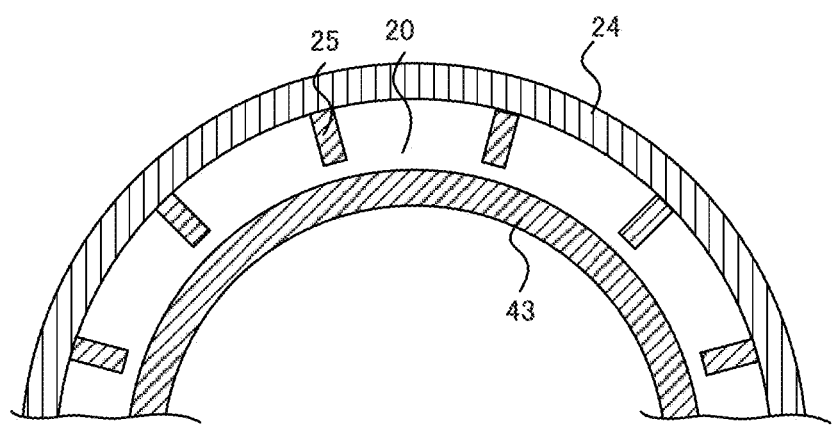
FIG. 15 is a partial cross-sectional view of the main motor for a vehicle according to Embodiment 3.

The vehicle main motor 300 further includes second airflow regulating plates 25 extending in Y-axis direction on the inner peripheral surface of the joint frame 24 defining the flow channel 20 together with the outer peripheral surface of the cylindrical portion 43 of the first bearing box 4. The vehicle main motor 300 may include any number of second airflow regulating plates 25. FIG. 15 is a partial cross-sectional view of the main motor for a vehicle according to Embodiment 3. FIG. 15 is a cross-sectional view taken along line B-B in FIG. 14. In the example shown in FIG. 15, a plurality of second airflow regulating plates 25 is circumferentially arranged at regular intervals on the inner peripheral surface of the joint frame 24. Similarly to the first airflow regulating plates 22, the inclusion of the second airflow regulating plates 25 reduces the velocity components of air flowing through the flow channel 20 in the rotational direction about the rotor shaft 3. When the air flowing obliquely in the rotational direction about the rotor shaft 3 with respect to Y-axis direction collides with the edge of the air outlet 42, an air vortex forms and generates exhaust noise. The inclusion of the second airflow regulating plates 25 reduces the velocity components of air flowing through the flow channel 20 in the rotational direction about the rotor shaft 3. The second airflow regulating plates 25 thus rectify air flow into substantially laminar flow when reaching the air outlet 42. The substantially laminar flow reaching the air outlet 42 prevents an air vortex and reduces exhaust noise.

In the example shown in FIG. 15, a plurality of second airflow regulating plates 25 is circumferentially arranged at regular intervals on the inner peripheral surface of the joint frame 24. In some embodiments, the second airflow regulating plates 25 may be circumferentially arranged at irregular intervals on the inner peripheral surface of the joint frame 24. The second airflow regulating plates 25 circumferentially arranged at irregular intervals on the inner peripheral surface of the joint frame 24 reduce resonance produced in the vehicle main motor 300, and prevent an increase in the exhaust noise due to resonance.

The second airflow regulating plates 25 may each have a uniform height in the direction perpendicular to the rotor shaft 3, or have a larger height toward the air outlet 42. The second airflow regulating plate 25 having a larger height toward the air outlet 42 in the direction perpendicular to the rotor shaft 3 more effectively rectifies air flow toward the air outlet 42, and prevents an increase in the exhaust noise.

As described above, the vehicle main motor 300 according to Embodiment 3 of the present disclosure includes the second airflow regulating plates 25 arranged on the inner peripheral surface of the joint frame 24 defining the flow channel 20 together with the outer peripheral surface of the cylindrical portion 43 of the first bearing box 4 to reduce exhaust noise.

Embodiment 4

Figure 16:
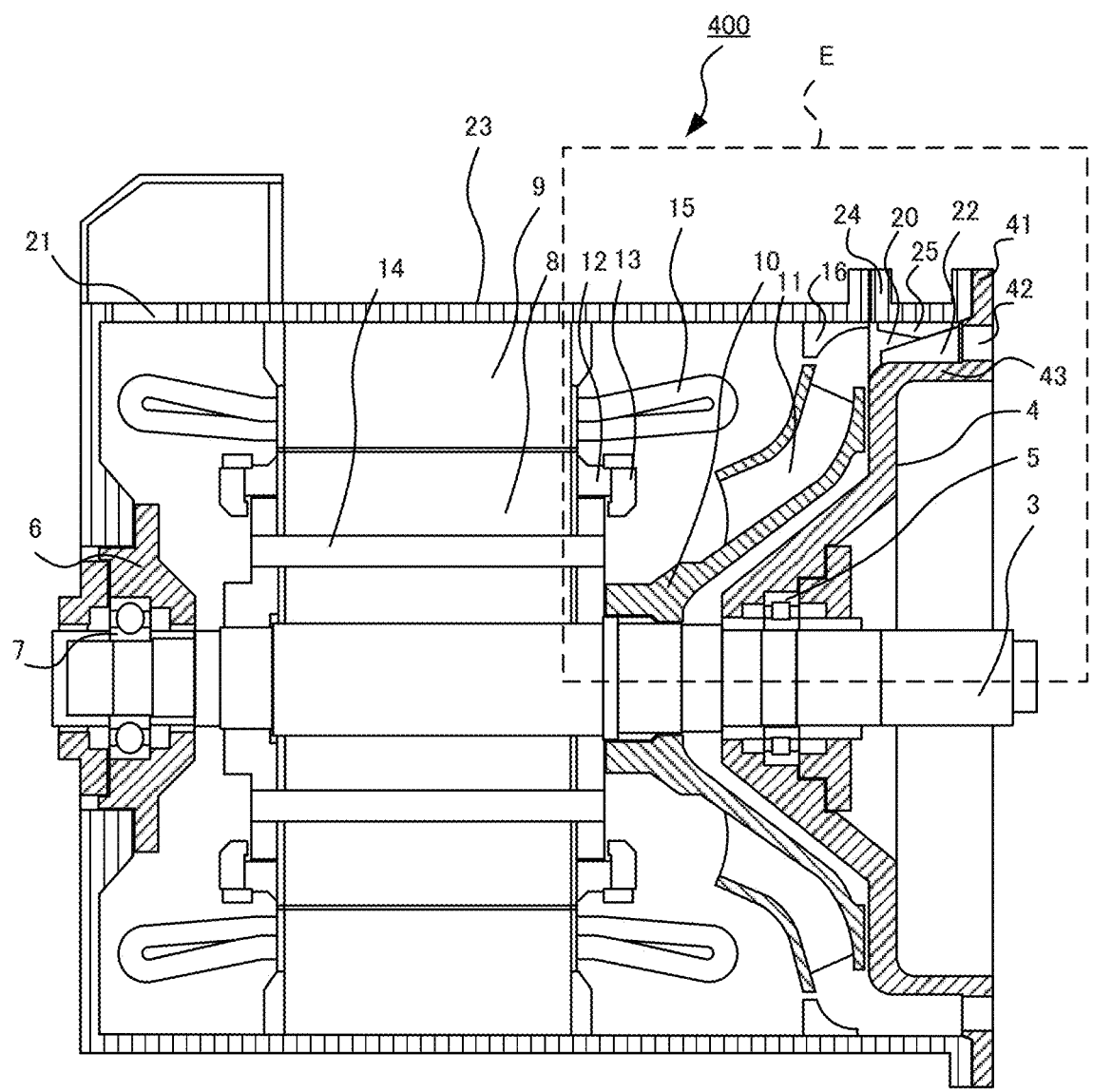
FIG. 16 is a cross-sectional view of a main motor for a vehicle according to Embodiment 4 of the present disclosure.
Figure 16:
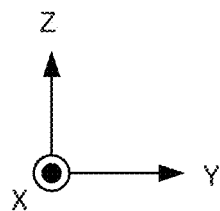
Figure 17:
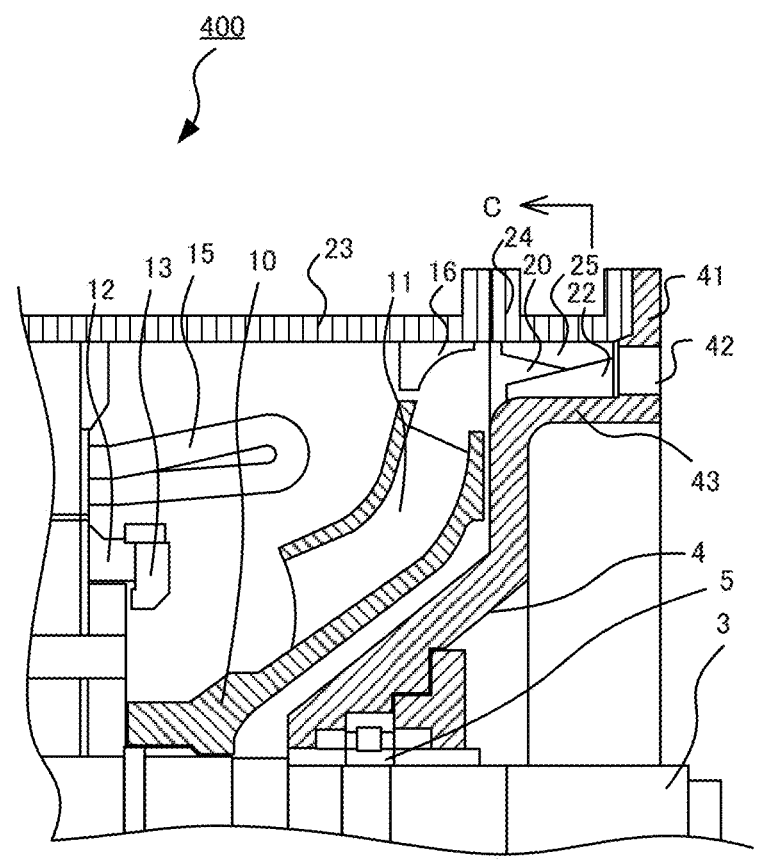
FIG. 17 is a partial cross-sectional view of the main motor for a vehicle according to Embodiment 4.

FIG. 16 is a cross-sectional view of a main motor for a vehicle according to Embodiment 4. FIG. 17 is a partial cross-sectional view of the main motor for a vehicle according to Embodiment 4. FIG. 17 is an enlarged view of an area E shown in FIG. 16. A vehicle main motor 400 according to Embodiment 4 further includes first airflow regulating plates 22 extending in Y-axis direction on an outer peripheral surface of a cylindrical portion 43 of a first bearing box 4, similarly to the vehicle main motor 200 according to Embodiment 2, in addition to the components in the vehicle main motor 300 according to Embodiment 3. The vehicle main motor 400 may include any number of first airflow regulating plates 22 and second airflow regulating plates 25.

Figure 18:
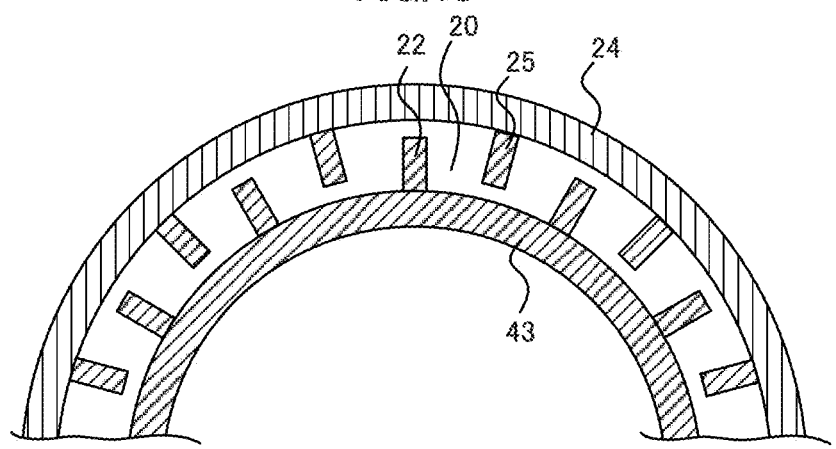
FIG. 18 is a partial cross-sectional view of the main motor for a vehicle according to Embodiment 4.

FIG. 18 is a partial cross-sectional view of the main motor for a vehicle according to Embodiment 4. FIG. 18 is a cross-sectional view taken along line C-C in FIG. 17. In the example shown in FIG. 18, a plurality of first airflow regulating plates 22 and a plurality of second airflow regulating plates 25 are circumferentially arranged at regular intervals respectively on the outer peripheral surface of the cylindrical portion 43 of the first bearing box 4 and the inner peripheral surface of the joint frame 24. In the same manner as in Embodiments 2 and 3, the inclusion of the first airflow regulating plates 22 and the second airflow regulating plates 25 reduces the velocity components of air flowing through the flow channel 20 in the rotational direction about the rotor shaft 3. When the air flowing obliquely in the rotational direction about the rotor shaft 3 with respect to Y-axis direction collides with the edge of the air outlet 42, an air vortex forms and generates exhaust noise. The inclusion of the first airflow regulating plates 22 and the second airflow regulating plates 25 reduce the velocity components of air flowing through the flow channel 20 in the rotational direction about the rotor shaft 3. The first airflow regulating plates 22 and the second airflow regulating plates 25 thus rectify air flow into substantially laminar flow when reaching the air outlet 42. The substantially laminar flow reaching the air outlet 42 prevents an air vortex and reduces exhaust noise.

In the example shown in FIG. 18, a plurality of first airflow regulating plates 22 and a plurality of second airflow regulating plates 25 are circumferentially arranged at regular intervals respectively on the outer peripheral surface and the inner peripheral surface defining the flow channel 20. In some embodiments, a plurality of first airflow regulating plates 22 and a plurality of second airflow regulating plates 25 may be circumferentially arranged at irregular intervals on the outer peripheral surface and the inner peripheral surface defining the flow channel 20 respectively. The first airflow regulating plates 22 and the second airflow regulating plates 25 circumferentially arranged at irregular intervals on the outer peripheral surface and the inner peripheral surface defining the flow channel 20 reduce resonance produced in the vehicle main motor 400, and prevent an increase in the exhaust noise due to resonance. Either the first airflow regulating plates 22 or the second airflow regulating plates 25 may be circumferentially arranged at regular intervals respectively on the outer peripheral surface and the inner peripheral surface defining the flow channel 20, and the other plates may be circumferentially arranged at irregular intervals on the inner peripheral surface or the outer peripheral surface defining the flow channel 20.

The first airflow regulating plates 22 and the second airflow regulating plates 25 may each have a uniform height in the direction perpendicular to the rotor shaft 3, or may have a larger height toward the air outlet 42. The first airflow regulating plate 22 and the second airflow regulating plate 25 each having a larger height toward the air outlet 42 in the direction perpendicular to the rotor shaft 3 more effectively rectify air flow toward the air outlet 42, and prevent an increase in the exhaust noise.

As described above, the vehicle main motor 400 according to Embodiment 4 of the present disclosure includes the first airflow regulating plates 22 arranged on the outer peripheral surface of the cylindrical portion 43 of the first bearing box 4 and the second airflow regulating plates 25 arranged on the inner peripheral surface of the joint frame 24 defining the flow channel 20 together with the outer peripheral surface of the cylindrical portion 43 of the first bearing box 4 to reduce exhaust noise.

The present disclosure is not limited to the embodiments described above. The air inlet 21 may be formed in the face of the frame 2 perpendicular to Y-axis direction.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 2, 52 Frame
Rotor shaft
4, 55 First bearing box
5, 7 Bearing
6 Second bearing box
8 Rotor core
9 Stator core
10, 56 Fan
11, 57 Blade
12 Rotor bar
13 Short-circuit ring
14 Air passage
15 Stator coil
16, 58 Air guide
20, 59 Flow channel
21, 53 Air inlet
22 First airflow regulating plate
23 Main frame
24 Joint frame
25 Second airflow regulating plate
41 End face
42, 54 Air outlet
43 Cylindrical portion
100, 200, 300, 400, 500 Vehicle main motor
61 Coupling

The invention claimed is:

1. A main motor for a vehicle, the motor comprising:
a frame fixed to the vehicle;
a rotor shaft received in the frame;
a rotor core fitted on the rotor shaft and rotatable integrally with the rotor shaft;
a rotor conductor retained in the rotor core;
a stator core attached to an inner peripheral surface of the frame and facing an outer peripheral surface of the rotor core across a gap;
a stator coil retained in the stator core;
a first bearing box and a second bearing box attached to the frame, the first bearing box and the second bearing box facing each other in a direction along the rotor shaft across the rotor core and the stator core, the first bearing box and the second bearing box each retaining a bearing supporting the rotor shaft in a rotatable manner; and
a fan attached to the rotor shaft between the first bearing box and the rotor core and rotatable integrally with the rotor shaft, the fan including blades,
wherein the frame has, in a portion of the frame to which the second bearing box is attached or in a portion of the frame facing the second bearing box, an air inlet for taking in exterior air around the frame,
the first bearing box has, in an end face of the first bearing box that is one of end faces perpendicular to the direction along the rotor shaft and is farther from the fan, an air outlet for air taken in through the air inlet to exit,
the first bearing box includes a cylindrical portion continuous with the end face farther from the fan, the cylindrical portion having an outer peripheral surface facing the inner peripheral surface of the frame across a gap defining a flow channel for the air,
the air taken in through the air inlet passes through the gap between the outer peripheral surface of the rotor core and the stator core, the fan, and the flow channel between the outer peripheral surface of the cylindrical portion of the first bearing box and the inner peripheral surface of the frame and exits through the air outlet, and
a value obtained by dividing a distance between an outer periphery of the blades in the fan and the air outlet by an outer radius of the blades at least 0.3.

2. The main motor according to claim 1, wherein
the frame includes
a main frame having an inner peripheral surface to which the stator core is attached, and
a joint frame receiving the first bearing box and adjacent to the main frame in the direction along the rotor shaft, and
the flow channel is defined between the outer peripheral surface of the cylindrical portion of the first bearing box and an inner peripheral surface of the joint frame.

3. The main motor according to claim 1, further comprising:
a first airflow regulating plate extending in the direction along the rotor shaft on the outer peripheral surface of the cylindrical portion of the first bearing box.

4. The main motor according to claim 2, further comprising:
a first airflow regulating plate extending in the direction along the rotor shaft on the outer peripheral surface of the cylindrical portion of the first bearing box.

5. The main motor according to claim 3, further comprising:
a plurality of the first airflow regulating plates circumferentially arranged at regular intervals on the cylindrical portion of the first bearing box.

6. The main motor according to claim 3, further comprising:
a plurality of the first airflow regulating plates circumferentially arranged at irregular intervals on the cylindrical portion of the first bearing box.

7. The main motor according to claim 3, wherein
the first airflow regulating plate has a larger height toward the air outlet in a direction perpendicular to the rotor shaft.

8. The main motor according to claim 1, further comprising:
a second airflow regulating plate extending in a direction along the rotor shaft on the inner peripheral surface of the frame defining the flow channel together with the outer peripheral surface of the cylindrical portion of the first bearing box.

9. The main motor according to claim 8, further comprising:
- a plurality of the second airflow regulating plates circumferentially arranged at regular intervals on the inner peripheral surface of the frame.

10. The main motor according to claim 8, further comprising:
- a plurality of the second airflow regulating plates circumferentially arranged at irregular intervals on the inner peripheral surface of the frame.

11. The main motor according to claim 8, wherein
- the second airflow regulating plate has a larger height toward the air outlet in a direction perpendicular to the rotor shaft.

\* \* \* \* \*